(12) United States Patent  (10) Patent No.: US 7,933,256 B2
Abrishamkar et al.  (45) Date of Patent: Apr. 26, 2011

(54) COHERENT SINGLE ANTENNA INTERFERENCE CANCELLATION FOR GSM/GPRS/EDGE

(75) Inventors: Farrokh Abrishamkar, San Diego, CA (US); Divaydeep Sikri, Victoria Way (GB)

(73) Assignee: Qualcomm Incorporated, San Diego, CA (US)

( * ) Notice: Subject to any disclaimer, the term of this patent is extended or adjusted under 35 U.S.C. 154(b) by 231 days.

(21) Appl. No.: 12/038,724

(22) Filed: Feb. 27, 2008

(65) Prior Publication Data

US 2009/0213971 A1 Aug. 27, 2009

(51) Int. Cl.
 *H04J 3/06* (2006.01)
(52) U.S. Cl. .................. 370/350; 370/514; 375/365
(58) Field of Classification Search .................. 370/350, 370/514; 375/365
 See application file for complete search history.

(56) References Cited

U.S. PATENT DOCUMENTS

| 5,267,249 | A | 11/1993 | Dong |
| 6,931,030 | B1* | 8/2005 | Dogan .......................... 370/509 |
| 7,200,172 | B2 | 4/2007 | Pukkila et al. |
| 7,295,636 | B2 | 11/2007 | Onggosanusi et al. |
| 7,308,056 | B2 | 12/2007 | Pukkila et al. |
| 2004/0170234 | A1 | 9/2004 | Pukkila et al. |
| 2004/0192215 | A1 | 9/2004 | Onggosanusi et al. |
| 2005/0152485 | A1 | 7/2005 | Pukkila et al. |
| 2006/0126765 | A1* | 6/2006 | Shin et al. ..................... 375/343 |
| 2006/0203943 | A1* | 9/2006 | Scheim et al. ................. 375/341 |
| 2006/0227853 | A1* | 10/2006 | Liang et al. ................... 375/142 |
| 2007/0058709 | A1 | 3/2007 | Chen et al. |
| 2008/0125070 | A1* | 5/2008 | Grieco et al. ................. 455/255 |
| 2009/0207944 | A1* | 8/2009 | Furman et al. ................ 375/329 |

FOREIGN PATENT DOCUMENTS

| EP | 0396403 | 11/1990 |
| EP | 0969608 | 1/2000 |
| EP | 1347611 | 9/2003 |
| EP | 1681775 | 7/2006 |
| WO | 2007060229 | 5/2007 |

OTHER PUBLICATIONS

International Search Report—PCT/US09/034794, International Searching Authority—European Patent Office, Oct. 20, 2009.
Written Opinion—PCT/US09/034794, International Searching Authority—European Patent Office, Oct. 20, 2009.

* cited by examiner

*Primary Examiner* — Melvin Marcelo
(74) *Attorney, Agent, or Firm* — Kenneth K. Vu; Ashish L. Patel

(57) ABSTRACT

A method for midamble estimation comprises the steps of receiving a burst of symbols, selecting a subset of the burst of symbols that comprises a first midamble symbol, calculating, for each symbol in the subset, a corresponding midamble estimation error, and determining the lowest calculated midamble estimation error to locate the first midamble symbol. A receiver comprises an antenna configured to receive a burst of symbols, a timing estimator configured to select a subset of the burst of symbols that comprises a first midamble symbol, a midamble estimator configured to calculate, for each symbol in the subset, a corresponding midamble estimation error, and a processor configured to select the symbol in the subset corresponding to a lowest calculated midamble estimation error as the first midamble symbol.

46 Claims, 13 Drawing Sheets

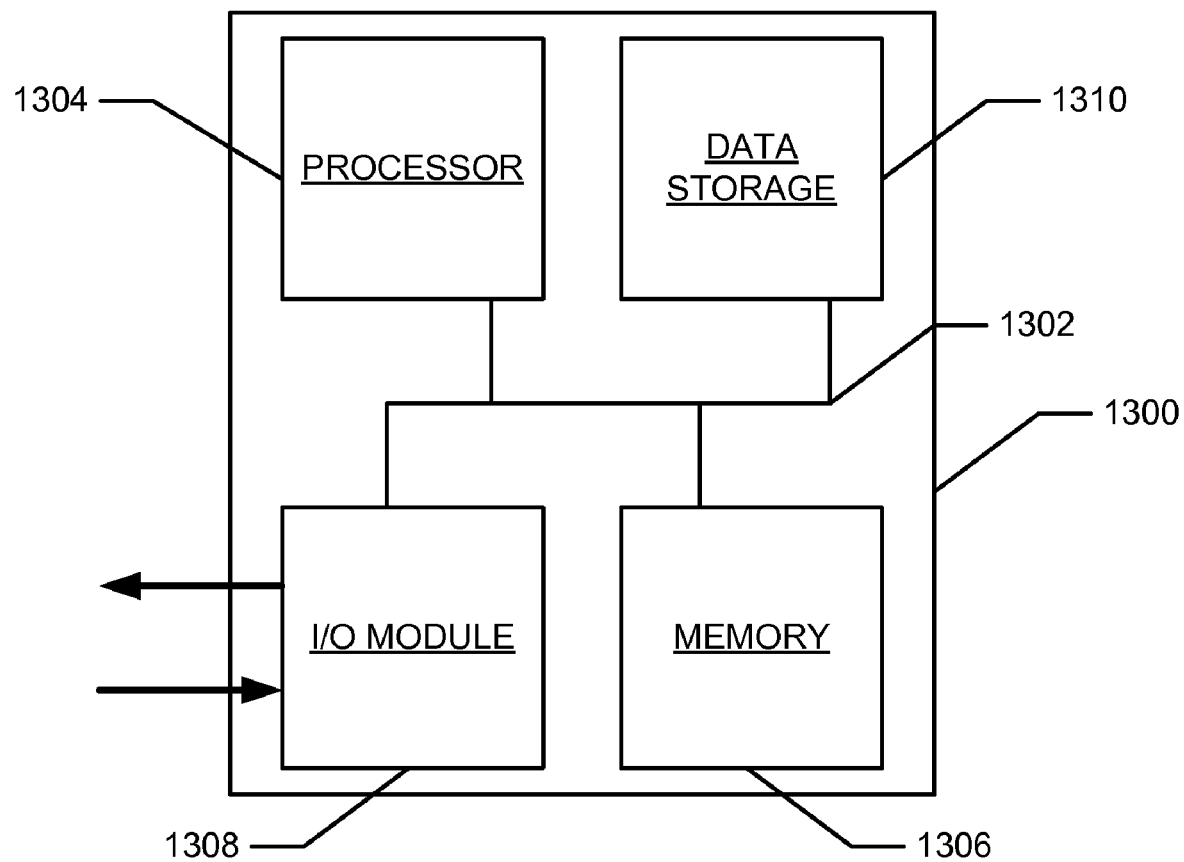

COHERENT SINGLE ANTENNA INTERFERENCE CANCELLATION FOR GSM/GPRS/EDGE

BACKGROUND

1. Field

The present invention relates to wireless communication and, in particular, relates to coherent single antenna interference cancellation.

2. Background

In many communication systems utilizing GSM, GPRS, EDGE or the like, a receiver's ability to properly decode a received signal depends upon the receiver's ability to maintain accurate symbol timing. As wireless communications become ever more prevalent, however, increasing amounts of interference can negatively impact a receiver's ability to maintain this timing.

In one approach to maintaining symbol timing, a training sequence (e.g., midamble) is known to both a transmitter and a receiver. The receiver locates the training sequence in a burst of symbols, and accordingly determines when the data portion of a burst of symbols begins and ends. Locating the training sequence in an environment with interfering signals can be challenging, as the training sequence may easily become overwhelmed by interference from adjacent channels, multipaths and the like. Accordingly, it is desirable to provide a receiver able to reliably locate a training sequence in a burst of symbols in the presence of interference.

SUMMARY

According to one aspect of the subject technology, a method for midamble estimation comprises the steps of receiving a burst of symbols, selecting a subset of the burst of symbols that comprises a first midamble symbol, calculating, for each symbol in the subset, a corresponding midamble estimation error, and determining the lowest calculated midamble estimation error to locate the first midamble symbol.

According to another aspect of the subject technology, a method for midamble estimation comprises the steps of receiving a burst of symbols, selecting a subset of the burst of symbols that comprises a first midamble symbol, determining an estimated channel corresponding to each symbol in the subset, suppressing interference on each estimated channel using single antenna interference cancellation, decoding each estimated channel to obtain a corresponding sequence of estimated data symbols, performing a cyclic redundancy check on each sequence of estimated data symbols until a valid condition is detected, and determining the symbol in the subset corresponding to the valid condition to be the first midamble symbol.

According to yet another aspect of the subject technology, a receiver comprises an antenna configured to receive a burst of symbols, a timing estimator configured to select a subset of the burst of symbols that comprises a first midamble symbol, a midamble estimator configured to calculate, for each symbol in the subset, a corresponding midamble estimation error, and a processor configured to select the symbol in the subset corresponding to a lowest calculated midamble estimation error as the first midamble symbol.

According to yet another aspect of the subject technology, a receiver comprises an antenna configured to receive a burst of symbols, a timing estimator configured to select a subset of the burst of symbols that comprises a first midamble symbol, a channel estimator configured to determine an estimated channel corresponding to each symbol in the subset, a single antenna interference cancellation device configured to suppress interference on each estimated channel, a data processor configured to decode each estimated channel to obtain a corresponding sequence of estimated data symbols, and a validation device configured to perform a cyclic redundancy check on each sequence of estimated data symbols until a valid condition is detected, and to determine the symbol in the subset corresponding to the valid condition to be the first midamble symbol.

According to yet another aspect of the subject technology, a machine-readable medium comprises instructions for midamble estimation. The instructions comprises code for receiving a burst of symbols, selecting a subset of the burst of symbols that comprises a first midamble symbol, calculating, for each symbol in the subset, a corresponding midamble estimation error, and determining the lowest calculated midamble estimation error to locate the first midamble symbol.

According to yet another aspect of the subject technology, a machine-readable medium comprises instructions for midamble estimation. The instructions comprise code for receiving a burst of symbols, selecting a subset of the burst of symbols that comprises a first midamble symbol, determining an estimated channel corresponding to each symbol in the subset, suppressing interference on each estimated channel using single antenna interference cancellation, decoding each estimated channel to obtain a corresponding sequence of estimated data symbols, performing a cyclic redundancy check on each sequence of estimated data symbols until a valid condition is detected, and determining the symbol in the subset corresponding to the valid condition to be the first midamble symbol.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 13 is a block diagram illustrating a computer system with which certain aspects of the subject technology may be implemented.

DETAILED DESCRIPTION

Figure 1:
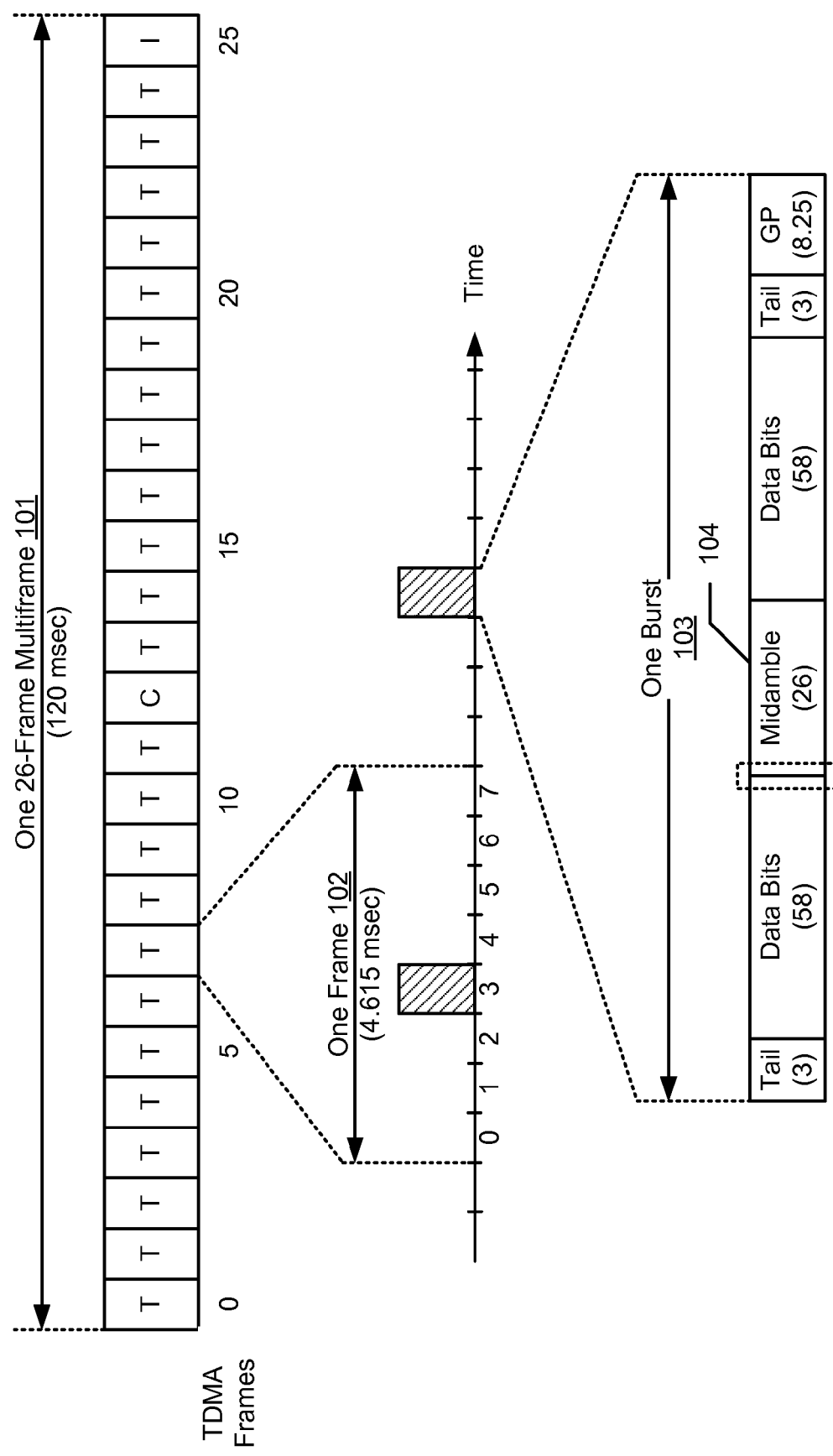
FIG. 1 illustrates exemplary frame and burst formats in GSM in accordance with one aspect of the subject technology.

FIG. 1 shows exemplary frame and burst formats in GSM. The timeline for downlink transmission is divided into multiframes. For traffic channels used to send user-specific data, each multiframe, such as exemplary multiframe 101, includes 26 TDMA frames, which are labeled as TDMA frames 0 through 25. The traffic channels are sent in TDMA frames 0 through 11 and TDMA frames 13 through 24 of each multiframe, as identified by the letter "T" in FIG. 1. A control channel, identified by the letter "C," is sent in TDMA frame 12. No data is sent in the idle TDMA frame 25 (identified by the letter "I"), which is used by the wireless devices to make measurements for neighbor base stations.

Each TDMA frame, such as exemplary TDMA frame 102, is further partitioned into eight time slots, which are labeled as time slots 0 through 7. Each active wireless device/user is assigned one time slot index for the duration of a call. User-specific data for each wireless device is sent in the time slot assigned to that wireless device and in TDMA frames used for the traffic channels.

The transmission in each time slot is called a "burst" in GSM. Each burst, such as exemplary burst 103, includes two tail fields, two data fields, a training sequence (or midamble) field, and a guard period (GP). The number of bits in each field is shown inside the parentheses. GSM defines eight different training sequences that may be sent in the training sequence field. Each training sequence, such as midamble 104, contains 26 bits and is defined such that the first five bits are repeated and the second five bits are also repeated. Each training sequence is also defined such that the correlation of that sequence with a 16-bit truncated version of that sequence is equal to (a) sixteen for a time shift of zero, (b) zero for time shifts of ±1, ±2, ±3, ±4, and ±5, and (3) a zero or non-zero value for all other time shifts.

One approach to locating a midamble in a burst of symbols serially compares hypotheses regarding the midamble position to determine which hypothesis provides the highest correlation energy between the known midamble sequence and the hypothesized position in the burst of symbols. This method is very sensitive to interference from multi-paths of the same midamble sequence, which can cause the correlation energy of inaccurate hypotheses to be affected by time-delayed copies thereof.

Figure 2:
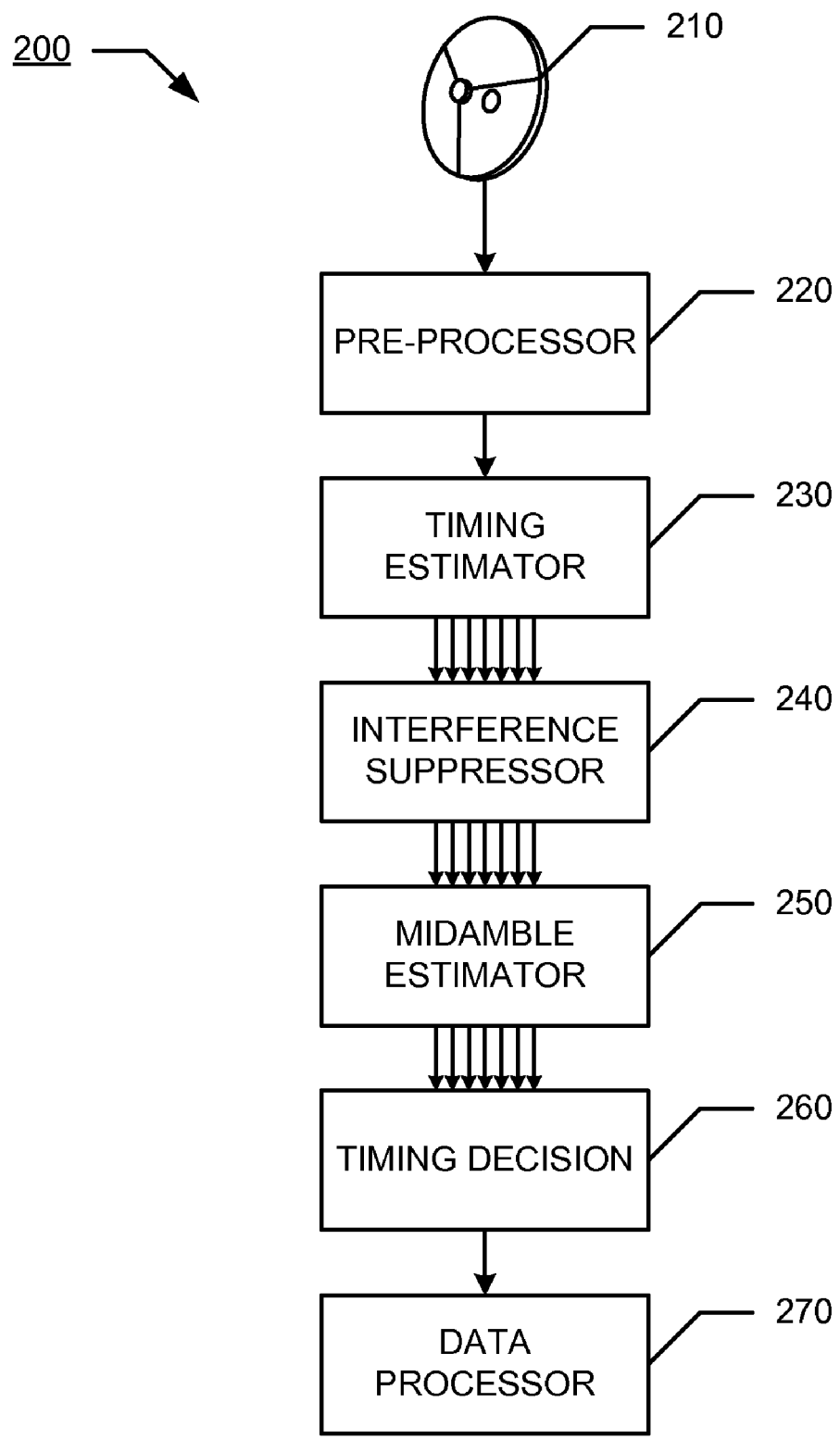
FIG. 2 illustrates a receiver for use in a wireless communication system in accordance with one aspect of the subject technology.

FIG. 2 illustrates a receiver for use in a wireless communication system in accordance with one aspect of the subject technology. Receiver 200 includes an antenna 210 configured to receive a wireless signal. While receiver 200 may be used in various communication systems, for clarity, receiver 200 is specifically described herein with respect to a GSM system. The received signal is provided to a pre-processor 220 which demodulates the signal to generate received samples. Pre-processor 220 may include a GMSK-to-BPSK rotator that performs phase rotation on the received samples. Timing estimator 230 receives the samples from pre-processor 220 and makes several hypotheses regarding where a training sequence of symbols (i.e., midamble) begins in the burst of data, to provide several hypothetical channel estimates. Interference suppressor 240 performs single antenna interference cancellation on each of the hypothesized channels, and midamble estimator 250 generates a midamble estimation error for each hypothesis. Timing decision circuit 260 compares the midamble estimation errors for each hypothesis and selects the hypothesis with the lowest midamble estimation error. The selection of a hypothesis by timing decision circuit 260 represents the position in the burst of symbols where the midamble is estimated to begin. Data processor 270 then processes the received symbols based upon this estimated timing, and outputs the data corresponding to the received symbols.

Rather than utilizing a determined correlation energy to select which hypothesis regarding the midamble timing is accurate, timing estimator 230 performs single antenna interference cancellation ("SAIC") to provide an estimate of the symbols making up the training sequence, which are compared against the previously-known symbols of that training sequence to determine an estimation error therefor. The operation of timing estimator 230 is illustrated in greater detail below.

To begin the search for the first midamble symbol, timing estimator 230 opens a "window" around the estimated beginning of the midamble sequence. The position of the first symbol of the midamble sequence can be estimated for a given burst, based upon the known structure of each burst. For example, as illustrated in FIG. 1, the beginning of midamble 104 in burst 103 begins in the $62^{nd}$ bit of the burst. Based upon this known structure, timing estimator 230 selects a window 105 of bits representing a series of hypotheses regarding where the first midamble symbol may be located. Exemplary window 105 is illustrated in greater detail in FIG. 3.

Figure 3:
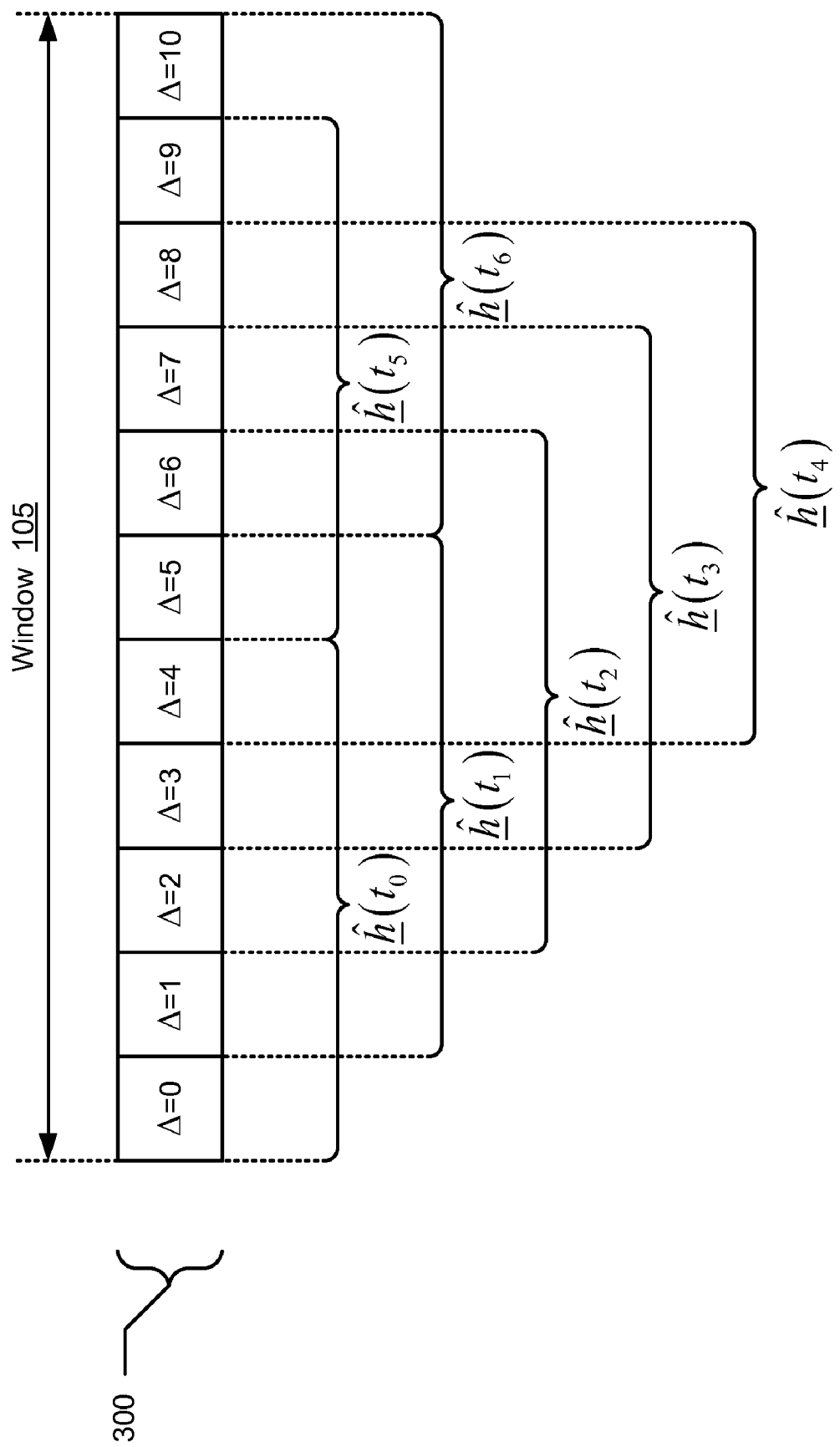
FIG. 3 illustrates a subset of symbols, including the first midamble symbol, that a receiver selects in accordance with one aspect of the subject technology.

As can be seen with reference to FIG. 3, exemplary window 105 comprises 11 symbols, labeled $\Delta=0$ to $\Delta=10$. Each $\Delta$ value represents the position of the symbol in the window. With reference to the position of a symbol in the entire burst, however, the $\Delta$ value is offset by an offset value (e.g., $\Delta=5$ may be offset by 61 to represent the position of this symbol in the entire burst). For the first seven symbols in window 105, timing estimator 230 generates a channel estimate from a sequence of five contiguous symbols (representing the five-tap channel format of GSM). For example, symbol $\Delta=0$ corresponds to channel estimate $\hat{h}(t_0)$, symbol $\Delta=1$ corresponds to channel estimate $\hat{h}(t_1)$, etc. Each of these channel estimates is then processed by interference suppressor 240 and midamble estimator 250 to determine estimated midamble symbols corresponding thereto, in order to determine a midamble estimation error therefor, as shown in greater detail below with respect to FIG. 4.

While in the present exemplary aspect, window 105 has been illustrated as consisting of exactly 11 symbols, the scope of the present invention is not limited to such an arrangement. Rather, as will be readily apparent to one of skill in the art, any window size (up to the size of the entire data burst) may be selected. For example, in accordance with one aspect of the subject technology, the size of the search window may be chosen to be twice the size of the expected minimum propagation delay. Alternatively, the search window size may be parameterized based on any other metric known to those of skill in the art.

According to one aspect, a channel estimate ĥ is generated by timing estimator 230 by correlating the received samples (corresponding to the hypothesized delay) with the reference samples (i.e., the known midamble sequence) for each hypothesis. Based on the correlation $R_{ys}(\Delta)$ between received signal y and midamble sequence s for a hypothesized delay $\Delta$, the channel estimate may be calculated as follows:

$$h^{(\delta)} = [R_{ys}(\delta), R_{ys}(\delta+1), \ldots, R_{ys}(\delta+4)] \text{ for } \delta = 0, 1, \ldots, 6 \quad (1)$$

$$\delta^* = \operatorname*{argmax}_{\delta}\{\|h_1^{(\delta)}\|^2\} \quad (2)$$

$$\hat{h} = [R_{ys}(\delta^*) R_{ys}(\delta^*+1) \ldots R_{ys}(\delta^*+4)]. \quad (3)$$

To test the hypothesis corresponding to each channel estimate, interference suppressor 240 performs SAIC on each estimated channel. SAIC is a method by which oversampled and/or real/imaginary decomposition of a signal is used to provide virtual antennas with separate sample sequences, such that weights may be applied to the virtual antennas to form a beam in the direction of a desired transmitter and a beam null in the direction of an undesired interference source. In general, SAIC may be achieved with one or multiple actual antennas at the receiver by using space-time processing, where "space" may be virtually achieved with inphase and quadrature components, and "time" may be achieved using late and early samples.

After SAIC, the channel estimate previously obtained is then substituted into the spatial temporal channel matrix [H] for one of the rows (each row representing one of the virtual antennas):

$$[H] = \begin{bmatrix} h_{10} & h_{11} & \ldots & h_{1v} \\ h_{20} & h_{21} & \ldots & h_{2v} \\ \vdots & \vdots & \vdots & \vdots \\ h_{M0} & h_{M1} & \ldots & h_{Mv} \end{bmatrix}. \quad (4)$$

The corresponding received samples for the channel estimate are tuned to the time of the hypothesis (which is assumed to contain the midamble), and the corresponding weights of the interference suppression filter are determined:

$$W_{SAIC}(t_k)[X]_{t_k} = \hat{Z}_k = [\hat{z}_k^1 \hat{z}_k^2 \hat{z}_k^3 \ldots \hat{z}_k^P] \quad (5)$$

where $$\hat{z}_k^j = \begin{bmatrix} (z_k^j)^1 \\ (z_k^j)^2 \\ \vdots \\ (z_k^j)^M \end{bmatrix}, \quad (6)$$

which is a M×1 columnvector for the $k^{th}$ hypothesis.

The channel matrix [H] is then re-estimated using the interference suppressed samples, to generate $[H]_k^{new}$:

$$[H]_k^{new} = Z'_k S^+ \quad (7)$$

where $Z'_k$ is the pseudoinverse of the midamble sequence matrix:

$$Z'_k = [\hat{z}_k^1 \hat{z}_k^2 \hat{z}_k^3 \ldots \hat{z}_k^P]^T. \quad (8)$$

The output of interference suppressor 240 is in the form [H]Ŝ, where [H] represents the channel matrix and Ŝ represents an estimate of the midamble sequence. Midamble estimator 250 receives the output of interference suppressor 240, and cancels out the [H] term (e.g., with $Z'_k$, the pseudo-inverse of [H]), so that the estimated midamble sequence Ŝ can be compared to the previously-known midamble sequence S. The difference between the estimated and known midamble sequences is determined according to Equation 9, below:

$$\|S - \hat{S}\|^2 = e_m(t_i) \quad (9)$$

to obtain a midamble estimation error $e_m(t_i)$ for each time $t_i$. Each time $t_i$ is equal to the hypothesized position $\Delta_i$ plus an offset $T_s$ from the beginning of the burst:

$$t_i = \Delta_i + T_s \quad (10)$$

Figure 4:
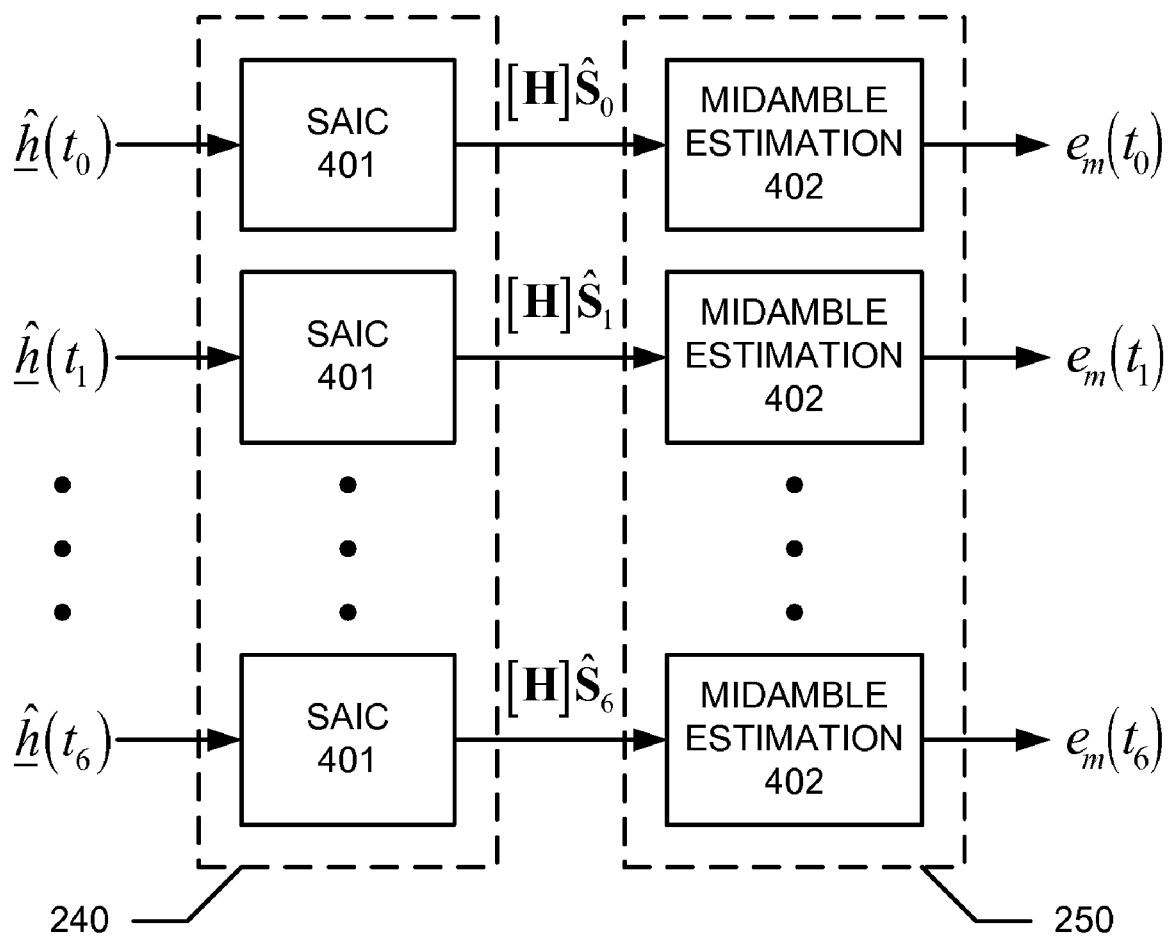
FIG. 4 illustrates in greater detail a portion of a receiver for use in a wireless communication system in accordance with one aspect of the subject technology.

FIG. 4 diagrammatically illustrates the foregoing calculations occurring in interference suppressor 240 and midamble estimator 250, in accordance with one aspect of the subject technology. Interference suppressor 240 performs interference cancellation on the channel estimates and re-estimates the channel matrix using the interference suppressed samples. Midamble estimator 250 compares the estimated midamble to the known midamble sequence for each hypothesis and generates a midamble estimation error $e_m$. According to various aspects of the subject technology, the interference suppression and midamble estimation of each channel estimate can be done serially, in parallel, or with some combination of serial and parallel processing.

Once the midamble estimation error $e_m(t_i)$ for each time $t_i$ is determined, timing decision block 260 determines which hypothesis corresponds to the lowest estimation error $e_m$. The other hypothesized timing values are discarded, and the signal is passed to data processor 270 for decoding and outputting the data in the signal, based upon the determined timing.

According to one aspect of the subject disclosure, data processor 270 comprises a soft output generator that receives the signal from timing decision block 260 and generates soft decisions that indicate the confidence in the detected bits. A soft output generator may implement an Ono algorithm, as is well known to those of skill in the art. Data processor 270 may further comprise a de-interleaver that de-interleaves the soft decisions, and passes the soft decisions to a Viterbi decoder that decodes the deinterleaved soft decisions and outputs decoded data.

Figure 5:
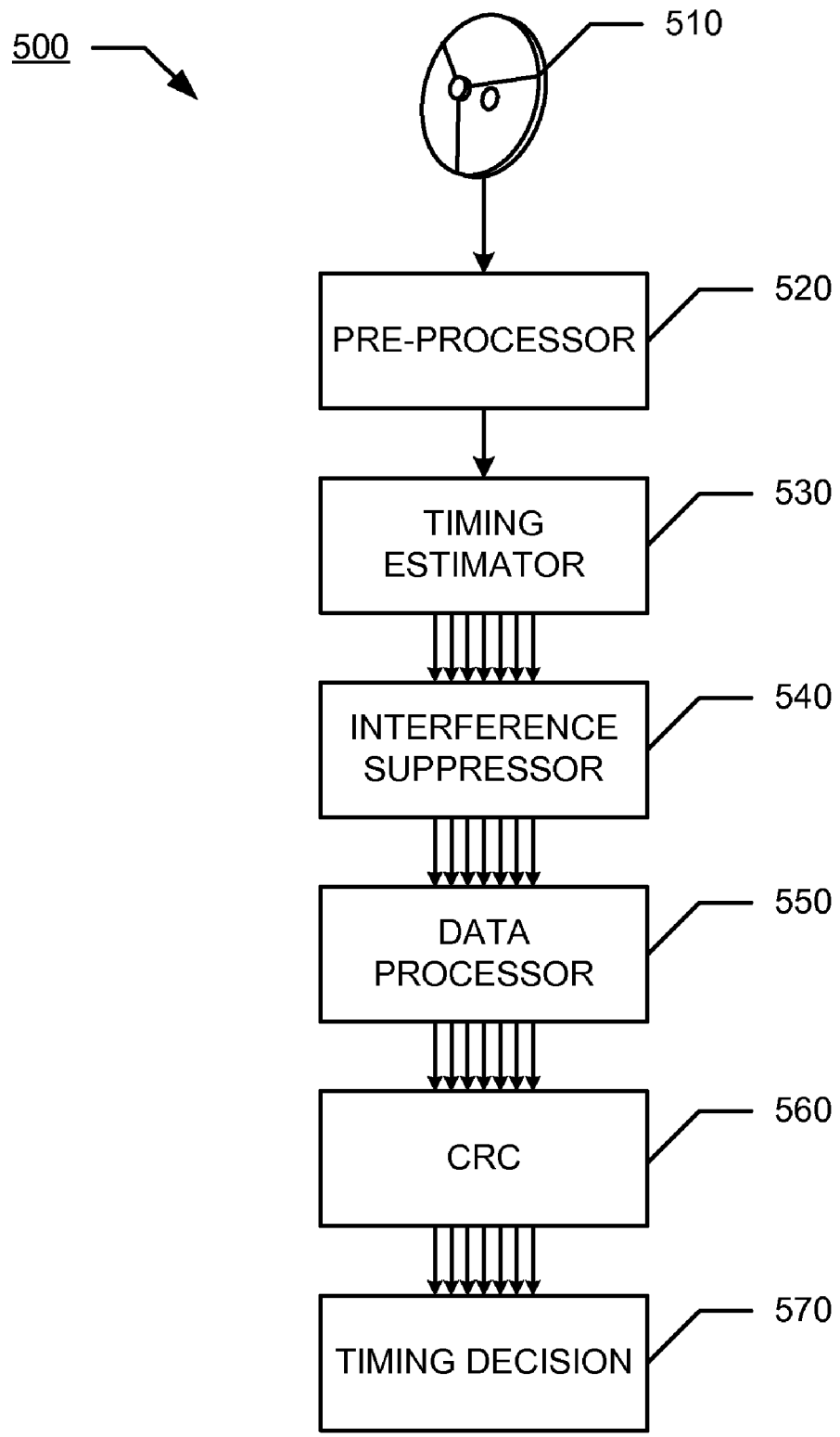
FIG. 5 illustrates a receiver for use in a wireless communication system in accordance with one aspect of the subject technology.

According to another aspect of the subject technology, the metric used to determine which midamble timing hypothesis is correct may be a cyclic redundancy check performed after each hypothesis is decoded. For example, FIG. 5 illustrates a receiver 500 in accordance with one aspect of the subject technology, in which the timing decision is delayed until after the signal corresponding to each hypothesis is decoded.

Receiver 500 includes an antenna 510 configured to receive a wireless signal such as, for example, an RF modulated GSM signal. The received signal is provided to a pre-processor 520 which demodulates the signal to generate received samples. Pre-processor 520 may also include a GMSK-to-BPSK rotator that performs phase rotation on the received samples. Timing estimator 530 receives the samples from pre-processor 520 and makes several hypotheses regarding where a midamble begins in the burst of data, to provide several hypothetical channel estimates. Interference suppressor 540 performs single antenna interference cancellation on each of the hypothesized channels, and data processor 550 then processes the received symbols for each hypothesized channel, and outputs the data corresponding to the received symbols. A cyclic redundancy check ("CRC") 560 is performed on the data outputted for each hypothesized channel, and continues until one of the data streams is validated. Timing decision block 570 then selects the hypothesis corresponding to the validation condition, and discards the other hypotheses.

Figure 6:
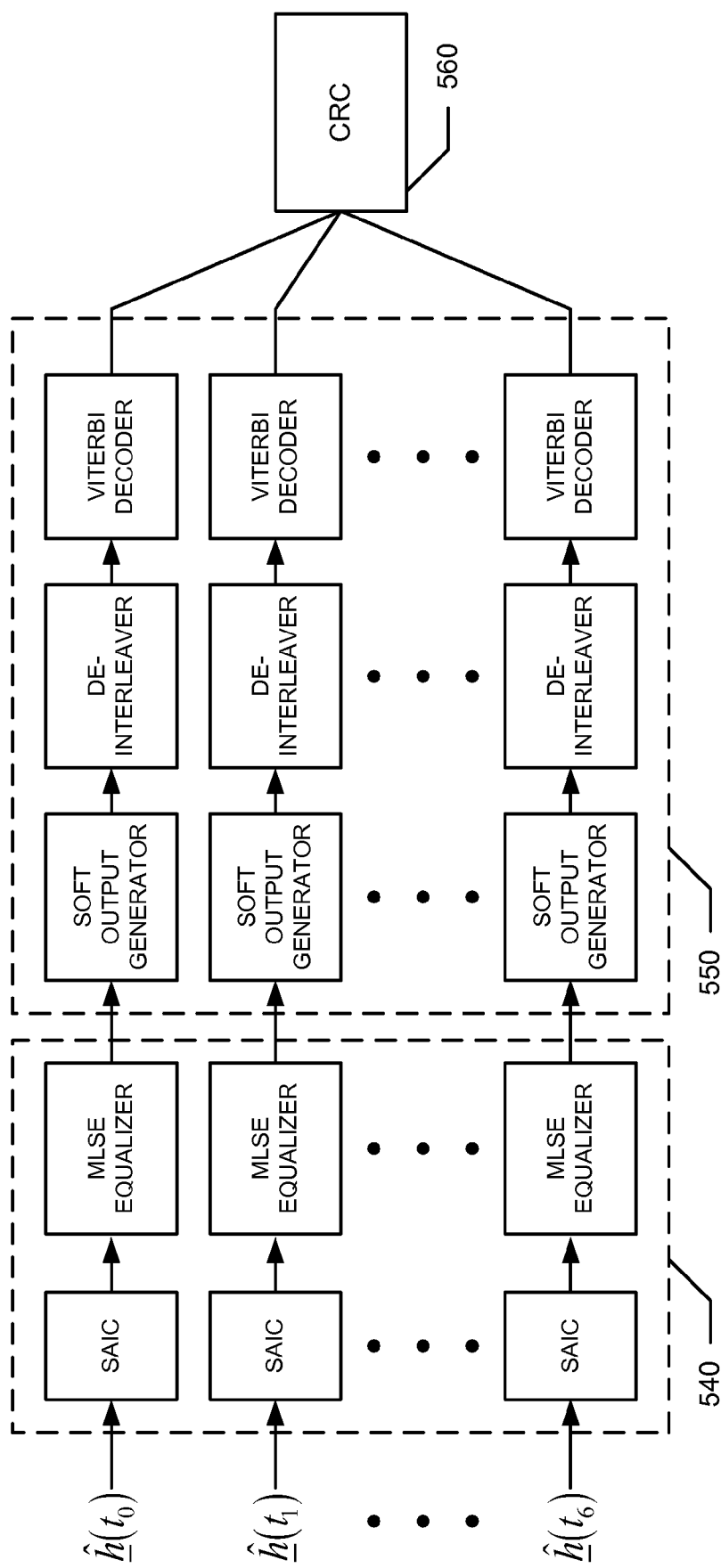
FIG. 6 illustrates in greater detail a portion of a receiver for use in a wireless communication system in accordance with one aspect of the subject technology.

FIG. 6 illustrates the operation of interference suppressor 540 and data processor 550 in greater detail, in accordance with one aspect of the subject technology. Interference suppressor 540 receives the channel estimates $\tilde{h}(t_0)$ through $\tilde{h}(t_6)$ from timing estimator 530, and performs both SAIC and maximum likelihood sequence estimate ("MLSE") equalization on each channel estimate. Interference suppressor 540 then provides the filtered signals corresponding to each hypothesis to data processor. Data processor 550 comprises a plurality of soft output generators that receive the filtered signals from interference suppressor 540 and generate soft decisions that indicate the confidence in the detected bits. Data processor 550 further comprise a plurality of de-interleavers that de-interleave the soft decisions, and that pass the soft decisions to a plurality of Viterbi decoders that decode the deinterleaved soft decisions and outputs decoded data to CRC block 560.

While the foregoing exemplary aspect is illustrated as performing the interference suppression and decoding on each estimated channel in parallel, the scope of the present invention is not limited to such an arrangement. Rather, a single interference suppressor and a single data processor may be utilized to process each estimated channel in a serial fashion. Alternatively, the receiver may use a combination of parallel and serial processing (e.g., with two channels per interferences suppressor and data processor, etc.).

Figure 7:
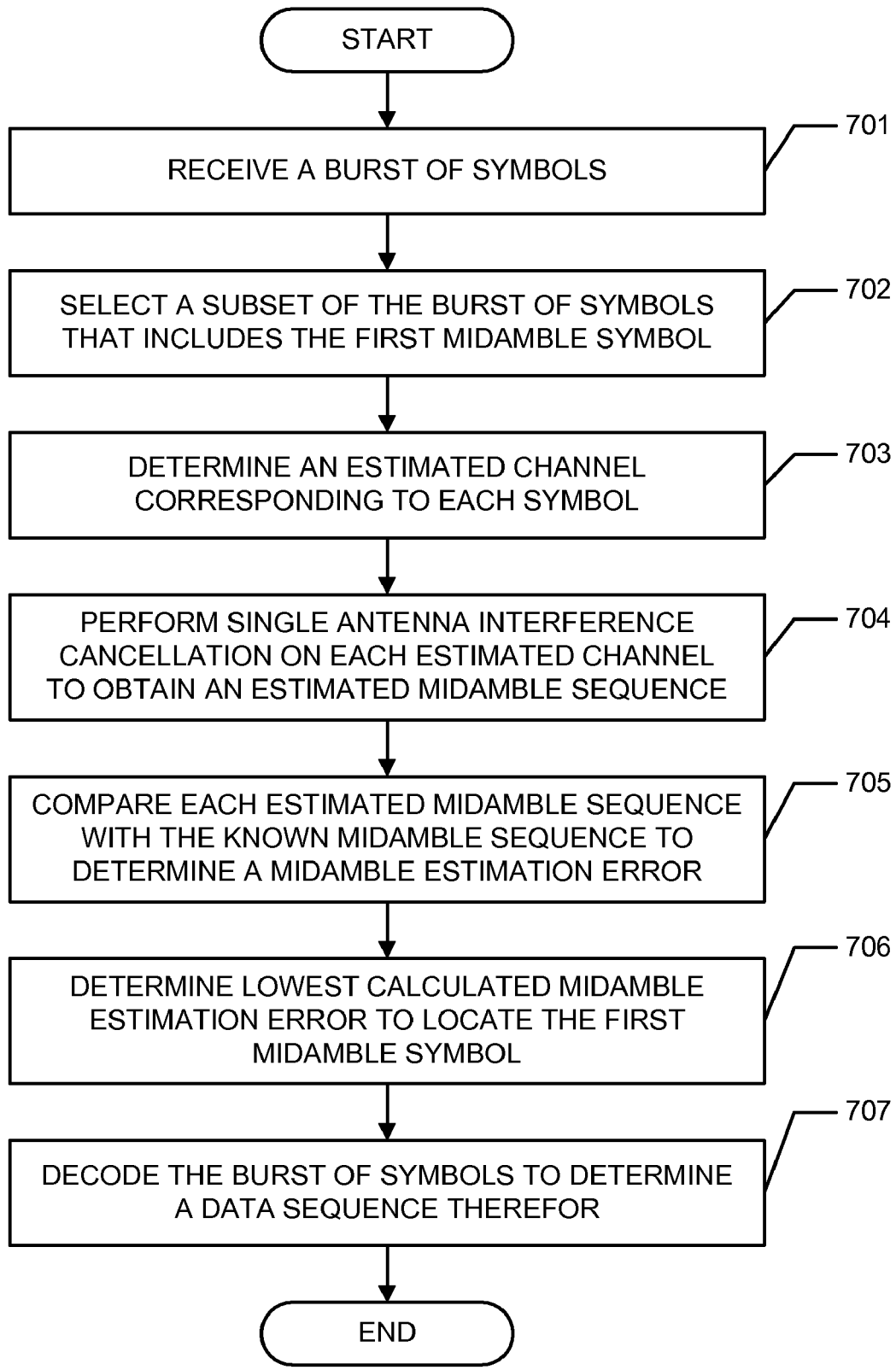
FIG. 7 illustrates a method for midamble estimation in accordance with one aspect of the subject technology.

FIG. 7 is a flow chart illustrating a method for midamble estimation in accordance with one aspect of the subject technology. The method begins with step 701, in which a receiver receives a burst of symbols. In step 702, the receiver selects a subset of the burst of symbols that includes the first midamble symbol. In step 703, the receiver determines an estimated channel corresponding to each symbol in the selected subset. In step 704, the receiver performs SAIC on each estimated channel to obtain an estimated midamble sequence. In step 705, the receiver compares each estimated midamble sequence to the previously-known midamble sequence to determine a midamble estimation error corresponding to each estimated channel. In step 706, the receiver determines which estimated channel corresponds to the lowest midamble estimation error in order to locate the first midamble symbol. In step 707, based upon the determined location of the first midamble symbol, the data sequence in the burst of symbols is decoded.

Figure 8:
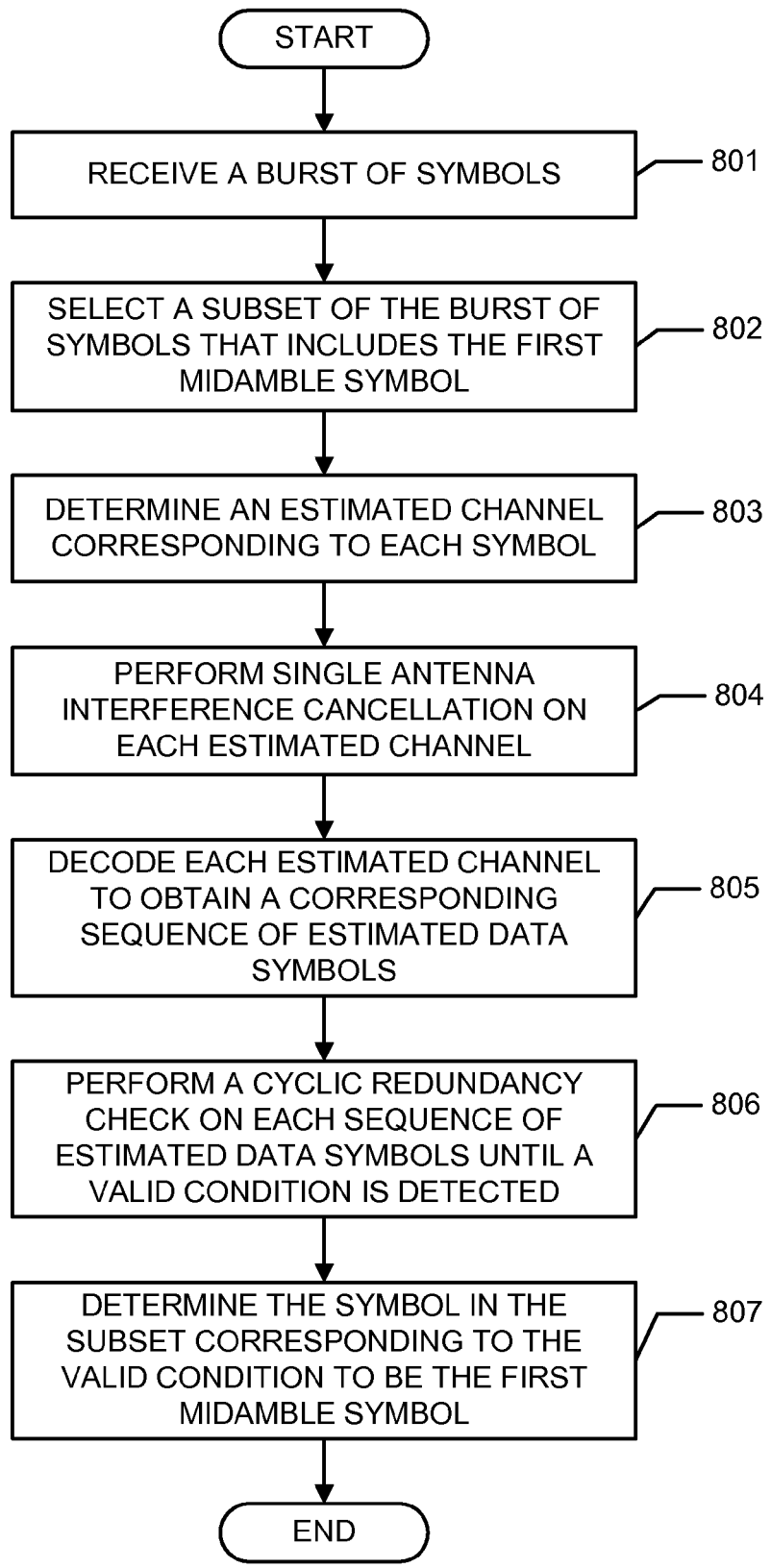
FIG. 8 illustrates a method for midamble estimation in accordance with one aspect of the subject technology.

FIG. 8 is a flow chart illustrating a method for midamble estimation in accordance with one aspect of the subject technology. The method begins with step 801, in which a receiver receives a burst of symbols. In step 802, the receiver selects a subset of the burst of symbols that includes the first midamble symbol. In step 803, the receiver determines an estimated channel corresponding to each symbol in the selected subset. In step 804, the receiver performs SAIC on each estimated channel, and in step 805, each estimated channel is decoded to obtain a sequence of estimated data symbols corresponding thereto. In step 806, the receiver performs a cyclic redundancy check ("CRC") on the estimated data symbols for each estimated channel until a validity condition is found. In step 807, the receiver determines the symbol in the subset selected in step 802 that corresponds to the validity condition to be the first midamble symbol.

Figure 9:
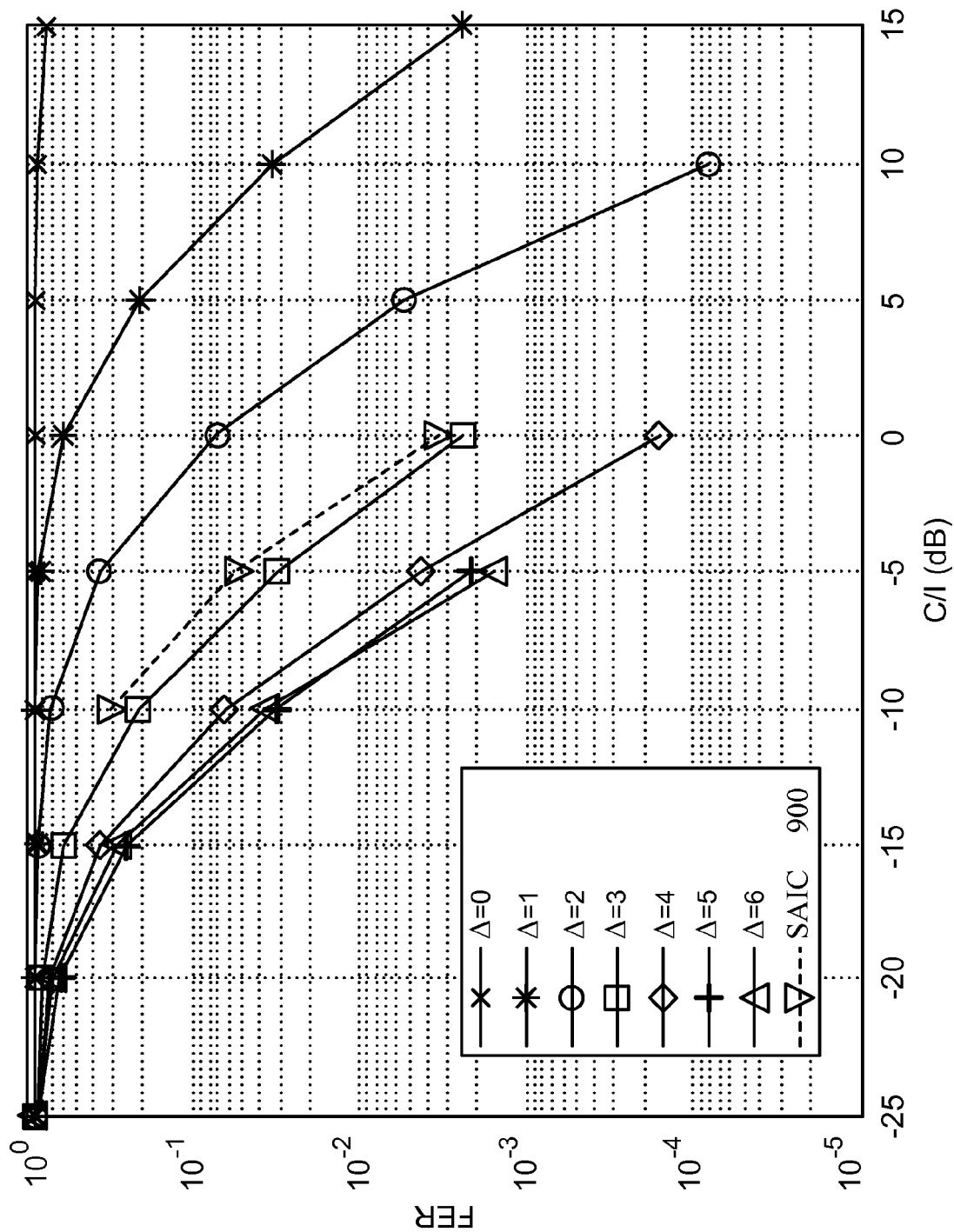
FIG. 9 is a chart illustrating performance improvements achievable utilizing various aspects of the subject technology.

FIG. 9 is a chart illustrating performance improvements achievable utilizing various aspects of the subject technology.

Figure 10:
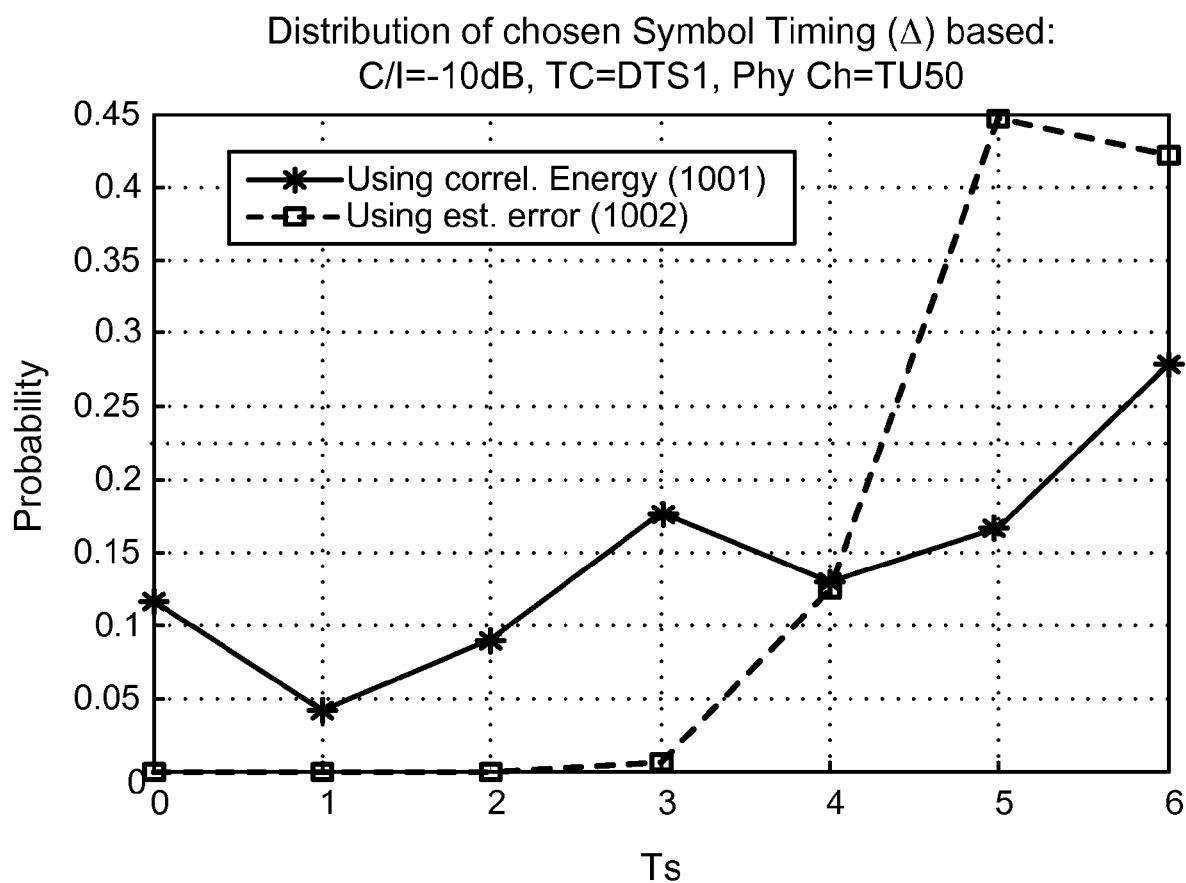
FIG. 10 is a chart illustrating performance improvements achievable utilizing various aspects of the subject technology.

FIG. 9 charts the frame error rate over a range of carrier to interference ("C/I") levels for exemplary receiver systems utilizing the midamble estimation techniques described in greater detail above. As can be seen with reference to FIG. 9, the performance of a receiver system 900 that estimates midamble timing using correlation energy is less than optimal, as there exist four timing hypotheses ($\Delta=3$, $\Delta=4$, $\Delta=5$ & $\Delta=6$) that provide improved frame error rate. A receiver system that estimates midamble timing utilizing midamble estimation error or CRC validity checks is more likely to select one of these preferable timings than receiver system 900, especially as the amount of interference increases. This improved performance is illustrated in greater detail in FIG. 10, in which the probability with which an exemplary receiver system utilizing midamble estimation error will choose a given midamble timing. As can be seen with reference to FIG. 10, receiver system 900 (which estimates midamble timing using correlation energy) chooses sub-optimal midamble symbol timing values (e.g., $\Delta=0$, $\Delta=1$, $\Delta=2$) with greater frequency than a receiver system 1002 that estimates midamble timing using midamble estimation error. Indeed, receiver system 1002 selects either $\Delta=5$ and $\Delta=6$ more than 80% of the time. As can be seen with reference to FIG. 9, these timings enjoy about 6 dB better performance than the average performance of receiver system 900. Even better performance benefits can be achieved with a receiver system that selects midamble timing based upon a CRC of decoded data, with a corresponding increase, however, in processing complexity.

Figure 11:
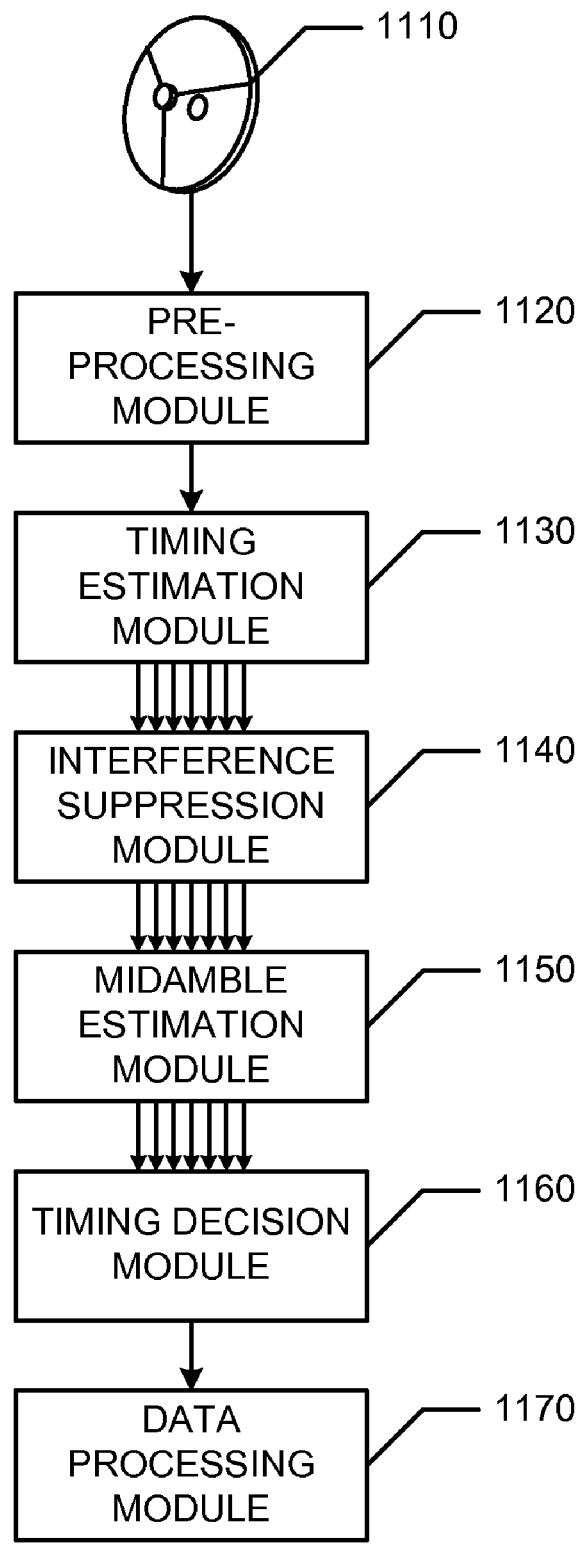
FIG. 11 illustrates a receiver for use in a wireless communication system in accordance with one aspect of the subject technology.

FIG. 11 illustrates a receiver for use in a wireless communication system in accordance with one aspect of the subject technology. Receiver 1100 includes an antenna module 1110 configured to receive a wireless signal such as, for example, an RF modulated GSM signal. The received signal is provided to a pre-processing module 1120 which demodulates the signal to generate received samples. Pre-processing module 1120 may also include a GMSK-to-BPSK rotator that performs phase rotation on the received samples. Timing estimation module 1130 receives the samples from pre-processing module 1120 and makes several hypotheses regarding where a training sequence of symbols (midamble) begins in the burst of data, to provide several hypothetical channel estimates. Interference suppression module 1140 performs single antenna interference cancellation on each of the hypothesized channels, and midamble estimation module 1150 generates a midamble estimation error for each hypothesis. Timing decision module 1160 compares the midamble estimation errors for each hypothesis and selects the hypothesis with the lowest midamble estimation error. The selection of a hypothesis by timing decision module 1160 represents the position in the burst of symbols where the midamble is estimated to begin. Data processing module 1170 then processes the received symbols based upon this estimated timing, and outputs the data corresponding to the received symbols.

Figure 12:
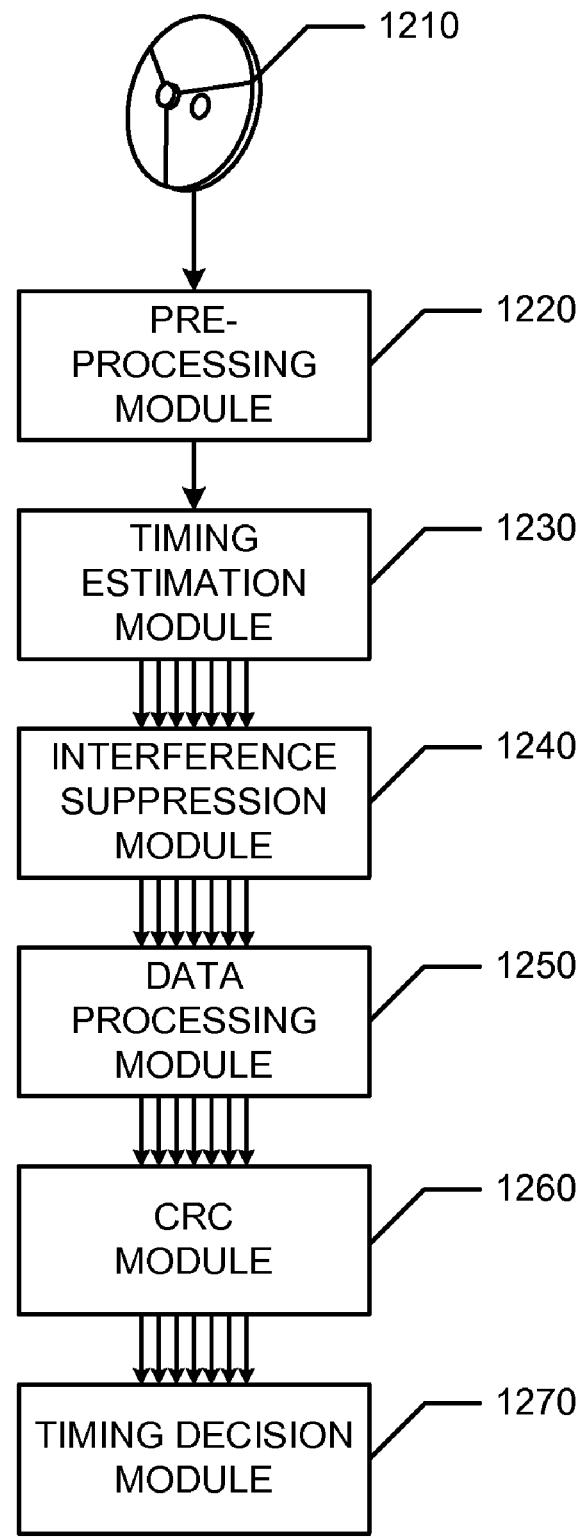
FIG. 12 illustrates a receiver for use in a wireless communication system in accordance with one aspect of the subject technology.

FIG. 12 illustrates a receiver 1200 for use in a wireless communication system in accordance with one aspect of the subject technology. Receiver 1200 includes an antenna module 1210 configured to receive a wireless signal such as, for example, an RF modulated GSM signal. The received signal is provided to a pre-processing module 1220 which demodulates the signal to generate received samples. Pre-processing module 1220 may also include a GMSK-to-BPSK rotator that performs phase rotation on the received samples. Timing estimation module 1230 receives the samples from pre-processing module 1220 and makes several hypotheses regarding where a training sequence of symbols (midamble) begins in the burst of data, to provide several hypothetical channel estimates. Interference suppression module 1240 performs single antenna interference cancellation on each of the hypothesized channels, and data processing module 1250 then processes the received symbols for each hypothesized channel, and outputs the data corresponding to the received symbols. A cyclic redundancy check ("CRC") is performed in module 1260 on the data outputted for each hypothesized channel, and continues until one of the data streams is validated. Timing decision module 1270 then selects the hypothesis corresponding to the validation condition, and discards the other hypotheses.

FIG. 13 is a block diagram that illustrates a computer system 1300 upon which an aspect may be implemented. Computer system 1300 includes a bus 1302 or other communication mechanism for communicating information, and a processor 1304 coupled with bus 1302 for processing information. Computer system 1300 also includes a memory 1306, such as a random access memory ("RAM") or other dynamic storage device, coupled to bus 1302 for storing information and instructions to be executed by processor 1304. Memory 1306 may also be used for storing temporary variable or other intermediate information during execution of instructions to be executed by processor 1304. Computer system 1300 further includes a data storage device 1310, such as a magnetic disk or optical disk, coupled to bus 1302 for storing information and instructions.

Computer system 1300 may be coupled via I/O module 1308 to a display device (not illustrated), such as a cathode ray tube ("CRT") or liquid crystal display ("LCD") for displaying information to a computer user. An input device, such as, for example, a keyboard or a mouse may also be coupled to computer system 1300 via I/O module 1308 for communicating information and command selections to processor 1304.

According to one aspect, midamble estimation is performed by a computer system 1300 in response to processor 1304 executing one or more sequences of one or more instructions contained in memory 1306. Such instructions may be read into memory 1306 from another machine-readable medium, such as data storage device 1310. Execution of the sequences of instructions contained in main memory 1306 causes processor 1304 to perform the process steps described herein. One or more processors in a multi-processing arrangement may also be employed to execute the sequences of instructions contained in memory 1306. In alternative aspects, hard-wired circuitry may be used in place of or in combination with software instructions to implement various aspects. Thus, aspects are not limited to any specific combination of hardware circuitry and software.

The term "machine-readable medium" as used herein refers to any medium that participates in providing instructions to processor 1304 for execution. Such a medium may take many forms, including, but not limited to, non-volatile media, volatile media, and transmission media. Non-volatile media include, for example, optical or magnetic disks, such as data storage device 1310. Volatile media include dynamic memory, such as memory 1306. Transmission media include coaxial cables, copper wire, and fiber optics, including the wires that comprise bus 1302. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for midamble estimation, comprising the steps of:
   receiving a burst of symbols;
   selecting a subset of the burst of symbols that comprises a first midamble symbol;
   calculating, for each symbol in the subset, a corresponding midamble estimation error; and
   determining the lowest calculated midamble estimation error to locate the first midamble symbol.

2. The method of claim 1, further comprising:
   decoding the burst of symbols to determine a data sequence for the burst of symbols.

3. The method of claim 1, wherein the calculating the midamble estimation error for each symbol in the subset comprises:

determining an estimated channel corresponding to the symbol;
performing single antenna interference cancellation on the estimated channel to obtain an estimated midamble sequence; and
comparing the estimated midamble sequence with a previously-known midamble sequence to determine the midamble estimation error.

4. The method of claim 3, wherein the calculating the midamble estimation error for each symbol in the subset further comprises:
performing single antenna interference cancellation on the estimated channel to obtain an estimated data sequence for the burst of symbols; and
comparing the estimated data sequence with a previously-determined data sequence to determine the midamble estimation error.

5. The method of claim 3, wherein the determining the estimated channel corresponding to each symbol comprises selecting a predetermined number of adjacent symbols in the subset corresponding to a number of taps in the estimated channel.

6. The method of claim 1, wherein the selecting a subset of the burst symbols comprises estimating a position of the first midamble symbol in the burst of symbols and selecting a plurality of symbols centered around the estimated position.

7. A method for midamble estimation, comprising the steps of:
receiving a burst of symbols;
selecting a subset of the burst of symbols that comprises a first midamble symbol;
determining an estimated channel corresponding to each symbol in the subset;
suppressing interference on each estimated channel using single antenna interference cancellation;
decoding each estimated channel to obtain a corresponding sequence of estimated data symbols;
performing a cyclic redundancy check on each sequence of estimated data symbols until a valid condition is detected; and
determining the symbol in the subset corresponding to the valid condition to be the first midamble symbol.

8. The method of claim 7, wherein the selecting a subset of the burst symbols comprises estimating a position of the first midamble symbol in the burst of symbols and selecting a plurality of symbols centered around the estimated position.

9. The method of claim 7, wherein the determining the estimated channel corresponding to each symbol comprises selecting a predetermined number of adjacent symbols in the subset corresponding to a number of taps in the estimated channel.

10. A receiver comprising:
an antenna configured to receive a burst of symbols;
a timing estimator configured to select a subset of the burst of symbols that comprises a first midamble symbol;
a midamble estimator configured to calculate, for each symbol in the subset, a corresponding midamble estimation error; and
a processor configured to select the symbol in the subset corresponding to a lowest calculated midamble estimation error as the first midamble symbol.

11. The receiver of claim 10, further comprising:
a decoder configured to decode the burst of symbols to determine a data sequence for the bust of symbols.

12. The receiver of claim 10, wherein the midamble estimator is configured to calculate the midamble estimation error for each symbol in the subset by:
determining an estimated channel corresponding to the symbol;
performing single antenna interference cancellation on the estimated channel to obtain an estimated midamble sequence; and
comparing the estimated midamble sequence with a previously-known midamble sequence to determine the midamble estimation error.

13. The receiver of claim 12, wherein the midamble estimator is further configured to calculate the midamble estimation error for each symbol in the subset by:
performing single antenna interference cancellation on the estimated channel to obtain an estimated data sequence for the burst of symbols; and
comparing the estimated data sequence with a previously-determined data sequence to determine the midamble estimation error.

14. The receiver of claim 12, wherein the midamble estimator is configured to determine the estimated channel corresponding to each symbol by selecting a predetermined number of adjacent symbols in the subset corresponding to a number of taps in the estimated channel.

15. The receiver of claim 10, wherein the timing estimator is configured to select a subset of the burst symbols by estimating a position of the first midamble symbol in the burst of symbols and selecting a plurality of symbols centered around the estimated position.

16. A receiver, comprising:
an antenna configured to receive a burst of symbols;
a timing estimator configured to select a subset of the burst of symbols that comprises a first midamble symbol;
a channel estimator configured to determine an estimated channel corresponding to each symbol in the subset;
a single antenna interference cancellation device configured to suppress interference on each estimated channel;
a data processor configured to decode each estimated channel to obtain a corresponding sequence of estimated data symbols; and
a validation device configured to perform a cyclic redundancy check on each sequence of estimated data symbols until a valid condition is detected, and to determine the symbol in the subset corresponding to the valid condition to be the first midamble symbol.

17. The receiver of claim 16, wherein the timing estimator is configured to select a subset of the burst symbols by estimating a position of the first midamble symbol in the burst of symbols and selecting a plurality of symbols centered around the estimated position.

18. The receiver of claim 16, wherein the channel estimator is configured to determine the estimated channel corresponding to each symbol by selecting a predetermined number of adjacent symbols in the subset corresponding to a number of taps in the estimated channel.

19. The receiver of claim 16, wherein the data processor comprises one or more of a soft output generator, a de-interleaver, and a Viterbi decoder.

20. A receiver comprising:
means for receiving a burst of symbols;
means for selecting a subset of the burst of symbols that comprises a first midamble symbol;
means for calculating, for each symbol in the subset, a corresponding midamble estimation error; and
means for selecting the symbol in the subset corresponding to a lowest calculated midamble estimation error as the first midamble symbol.

21. The receiver of claim 20, further comprising:
means for decoding the burst of symbols to determine a data sequence for the burst of symbols.

22. The receiver of claim 20, wherein the means for calculating the midamble estimation error for each symbol in the subset are configured to:
determine an estimated channel corresponding to the symbol;
perform single antenna interference cancellation on the estimated channel to obtain an estimated midamble sequence; and
compare the estimated midamble sequence with a previously-known midamble sequence to determine the midamble estimation error.

23. The receiver of claim 22, wherein the means for calculating the midamble estimation error for each symbol are further configured to:
perform single antenna interference cancellation on the estimated channel to obtain an estimated data sequence for the burst of symbols; and
compare the estimated data sequence with a previously-determined data sequence to determine the midamble estimation error.

24. The receiver of claim 22, wherein the means for calculating the midamble estimation error are configured to determine the estimated channel corresponding to each symbol by selecting a predetermined number of adjacent symbols in the subset corresponding to a number of taps in the estimated channel.

25. The receiver of claim 20, wherein the mean for selecting a subset of the burst symbols are configured to estimate a position of the first midamble symbol in the burst of symbols and to select a plurality of symbols centered around the estimated position.

26. A receiver, comprising:
means for receiving a burst of symbols;
means for selecting a subset of the burst of symbols that comprises a first midamble symbol;
means for determining an estimated channel corresponding to each symbol in the subset;
means for suppressing interference on each estimated channel;
means for decoding each estimated channel to obtain a corresponding sequence of estimated data symbols; and
means for performing a cyclic redundancy check on each sequence of estimated data symbols until a valid condition is detected, and to determine the symbol in the subset corresponding to the valid condition to be the first midamble symbol.

27. The receiver of claim 26, wherein the means for selecting a subset of the burst symbols are configured to estimate a position of the first midamble symbol in the burst of symbols and to select a plurality of symbols centered around the estimated position.

28. The receiver of claim 26, wherein the means for determining an estimated channel are configured to determine the estimated channel corresponding to each symbol by selecting a predetermined number of adjacent symbols in the subset corresponding to a number of taps in the estimated channel.

29. The receiver of claim 26, wherein the means for decoding comprise one or more of a soft output generator, a de-interleaver, and a Viterbi decoder.

30. A machine-readable medium comprising a data storage device stored with instructions for midamble estimation, wherein execution of the instructions is for:
receiving a burst of symbols;
selecting a subset of the burst of symbols that comprises a first midamble symbol;
calculating, for each symbol in the subset, a corresponding midamble estimation error; and
determining the lowest calculated midamble estimation error to locate the first midamble symbol.

31. The machine-readable medium of claim 30, wherein execution of the instruction is also for:
decoding the burst of symbols to determine a data sequence for the burst of symbols.

32. The machine-readable medium of claim 30, wherein execution of the instruction is also for:
determining an estimated channel corresponding to the symbol;
performing single antenna interference cancellation on the estimated channel to obtain an estimated midamble sequence; and
comparing the estimated midamble sequence with a previously-known midamble sequence to determine the midamble estimation error.

33. The machine-readable medium of claim 32, wherein execution of the instruction is also for:
performing single antenna interference cancellation on the estimated channel to obtain an estimated data sequence for the burst of symbols; and
comparing the estimated data sequence with a previously-determined data sequence to determine the midamble estimation error.

34. The machine-readable medium of claim 32, wherein execution of the instruction is also for selecting a predetermined number of adjacent symbols in the subset corresponding to a number of taps in the estimated channel.

35. The machine-readable medium of claim 30, wherein execution of the instruction is also for estimating a position of the first midamble symbol in the burst of symbols and selecting a plurality of symbols centered around the estimated position.

36. A machine-readable medium comprising a data storage device stored with instructions for midamble estimation, wherein execution of the instructions is for:
receiving a burst of symbols;
selecting a subset of the burst of symbols that comprises a first midamble symbol;
determining an estimated channel corresponding to each symbol in the subset;
suppressing interference on each estimated channel using single antenna interference cancellation;
decoding each estimated channel to obtain a corresponding sequence of estimated data symbols;
performing a cyclic redundancy check on each sequence of estimated data symbols until a valid condition is detected; and
determining the symbol in the subset corresponding to the valid condition to be the first midamble symbol.

37. The machine-readable medium of claim 36, wherein execution of the instruction is also for estimating a position of the first midamble symbol in the burst of symbols and selecting a plurality of symbols centered around the estimated position.

38. The machine-readable medium of claim 36, wherein execution of the instruction is also for selecting a predetermined number of adjacent symbols in the subset corresponding to a number of taps in the estimated channel.

39. The method of claim 3, wherein an output of the single antenna interference cancellation comprises $\hat{S}$, where $\hat{S}$ represents the estimated midamble sequence.

40. The method of claim 3, wherein an output of the single antenna interference cancellation is in the form $[H]\hat{S}$, where $[H]$ represents a channel matrix and $\hat{S}$ the estimated midamble sequence.

41. The receiver of claim 12, wherein an output of the single antenna interference cancellation comprises $\hat{S}$, where $\hat{S}$ represents the estimated midamble sequence.

42. The receiver of claim 12, wherein an output of the single antenna interference cancellation is in the form $[H]\hat{S}$, where $[H]$ represents a channel matrix and $\hat{S}$ represents the estimated midamble sequence.

43. The receiver of claim 22, wherein an output of the single antenna interference cancellation is in the form $[H]\hat{S}$, where $[H]$ represents a channel matrix and $\hat{S}$ the estimated midamble sequence.

44. The receiver of claim 22, wherein an output of the single antenna interference cancellation comprises $\hat{S}$, where $\hat{S}$ represents the estimated midamble sequence.

45. The machine-readable medium of claim 32, wherein an output of the single antenna interference cancellation is in the form $[H]\hat{S}$, where $[H]$ represents a channel matrix and $\hat{S}$ the estimated midamble sequence.

46. The machine-readable medium of claim 32, wherein an output of the single antenna interference cancellation comprises $\hat{S}$, where $\hat{S}$ represents the estimated midamble sequence.

* * * * *